(12) United States Patent
Dingli et al.

(10) Patent No.: US 11,594,046 B2
(45) Date of Patent: Feb. 28, 2023

(54) VEHICLE CARGO CAMERAS FOR SENSING VEHICLE CHARACTERISTICS

(71) Applicant: Pony AI Inc., Grand Cayman (KY)

(72) Inventors: Robert Dingli, Cupertino, CA (US); Peter G. Diehl, Shanghai (CN)

(73) Assignee: Pony AI Inc., Grand Cayman (KY)

( * ) Notice: Subject to any disclaimer, the term of this patent is extended or adjusted under 35 U.S.C. 154(b) by 322 days.

(21) Appl. No.: 16/830,842

(22) Filed: Mar. 26, 2020

(65) Prior Publication Data

US 2021/0303887 A1  Sep. 30, 2021

(51) Int. Cl.
| | | |
|---|---|---|
| *G06V 20/59* | (2022.01) | |
| *G08B 21/24* | (2006.01) | |
| *G08B 5/36* | (2006.01) | |
| *B60R 11/04* | (2006.01) | |
| *G06T 7/73* | (2017.01) | |
| *B60Q 5/00* | (2006.01) | |
| *B60W 60/00* | (2020.01) | |
| *G06Q 20/10* | (2012.01) | |
| *B60Q 3/20* | (2017.01) | |

(52) U.S. Cl.
CPC ............... *G06V 20/59* (2022.01); *B60Q 3/20* (2017.02); *B60Q 5/00* (2013.01); *B60R 11/04* (2013.01); *B60W 60/0016* (2020.02); *G06Q 20/102* (2013.01); *G06T 7/74* (2017.01); *G08B 5/36* (2013.01); *G08B 21/24* (2013.01); *B60R 2300/8006* (2013.01); *G06T 2207/30268* (2013.01)

(58) Field of Classification Search
CPC .......... G06V 20/59; G06V 20/58; B60Q 3/20; B60Q 5/00; B60Q 5/005; B60Q 9/00; B60Q 3/30; B60R 11/04; B60R 2300/8006; B60W 60/0016; G06Q 20/102; G06Q 20/085; G06T 7/74; G06T 2207/30268; G08B 5/36; G08B 21/24; G08B 3/10
See application file for complete search history.

(56) References Cited

U.S. PATENT DOCUMENTS

| | | | |
|---|---|---|---|
| 9,533,644 B2 | 1/2017 | Kasper | |
| 9,827,825 B2 | 11/2017 | Kwark | |
| 9,892,567 B2 | 2/2018 | Binion | |
| 10,223,844 B1* | 3/2019 | Schwie | G08B 25/10 |
| 2016/0332535 A1* | 11/2016 | Bradley | E05F 15/70 |
| 2017/0308834 A1* | 10/2017 | Kim | G06Q 10/06315 |
| 2017/0330044 A1* | 11/2017 | Telpaz | G05D 1/0088 |
| 2019/0197325 A1* | 6/2019 | Reiley | G08B 13/19602 |
| 2019/0251376 A1* | 8/2019 | Stoffel | G01C 21/3407 |
| 2021/0049384 A1* | 2/2021 | Morrow | G06Q 40/08 |

* cited by examiner

*Primary Examiner* — Brian Wilson

(57) ABSTRACT

Described herein are systems, methods, and computer readable media for capturing image data of one or more regions of a vehicle (e.g., a cargo area of an autonomous vehicle) at various particular times and assessing the image data to determine whether a past vehicle occupant has left behind one or more belongings of value in the vehicle. If it is determined that a former vehicle occupant has left behind an article of value, an audible message may be outputted from a speaker of the vehicle to inform the former occupant of the presence of the article in the vehicle or a notification may be sent to a mobile device of the former occupant. The audible message may be outputted, for example, while the former occupant is beyond a predetermined distance from the vehicle, but still within range of hearing the message.

20 Claims, 8 Drawing Sheets

VEHICLE CARGO CAMERAS FOR SENSING VEHICLE CHARACTERISTICS

The present invention relates generally to sensing in-vehicle characteristics, and more particularly, in some embodiments, to utilizing vehicle cargo cameras and other sensors to detect and respond to in-vehicle characteristics.

BACKGROUND

Autonomous vehicles, also referred to as driverless vehicles, are vehicles capable of making autonomous driving decisions without requiring human action or input. In general, autonomous vehicles include a variety of various types of sensors that provide sensor data that is analyzed/processed/manipulated by software/firmware/hardware onboard the vehicle or executing in a remote environment to make autonomous driving decisions such as when and how much to accelerate or decelerate, when and how much to turn the vehicle, when to brake the vehicle and what braking distance to maintain, and so forth.

In scenarios in which an autonomous vehicle is operating in the absence of a human capable of manually overriding operational control of the vehicle, various technical problems may arise relating to tasks that are typically performed by a human driver such as tasks involving interaction between the human driver and another vehicle occupant. Discussed herein are technical solutions that address these and other technical drawbacks associated with autonomous vehicle operation.

SUMMARY

In an example embodiment, a computer-implemented method for detecting presence of an object within a vehicle is disclosed. The method includes capturing first image data of a region of the vehicle prior to an occupant of the vehicle being within a first predetermined distance of the vehicle. The method further includes determining that the occupant has exited the vehicle, determining that the occupant is at least a second predetermined distance away from the vehicle, and capturing second image data of the region of the vehicle after the occupant is determined to be at least the second predetermined distance away from the vehicle. The method additionally includes performing a comparison analysis of the first image data and the second image data, determining, based at least in part on the comparison analysis, that the object is present in the second image data and absent from the first image data, and initiating one or more automated vehicle response measures based at least in part on determining that the object is present in the second image data and absent from the first image data.

In an example embodiment, capturing the first image data includes capturing a continuous stream of video data of the region of the vehicle, determining a timestamp corresponding to a point in time prior to the occupant of the vehicle being within the first predetermined distance of the vehicle, and retrieving a portion of the continuous stream of video data corresponding to the timestamp.

In an example embodiment, capturing the second image data includes capturing a continuous stream of video data of the region of the vehicle, determining a timestamp corresponding to a point in time that the occupant is at least the second predetermined distance away from the vehicle, and retrieving a portion of the continuous stream of video data corresponding to the timestamp.

In an example embodiment, the region of the vehicle is a cargo area of the vehicle, and capturing the first image data and capturing the second image data includes utilizing one or more cameras located in the cargo area to capture the first image data and the second image data, where the one or more cameras cumulatively provide a substantially complete field-of-view of the cargo area.

In an example embodiment, the method for detecting presence of an object within a vehicle further includes illuminating a light source in the cargo area while capturing at least one of the first image data or the second image data.

In an example embodiment, performing the comparison analysis of the first image data and the second image data includes performing an object detection analysis on each of the first image data and the second image data to detect any one or more objects present in at least one of the first image data or the second image data.

In an example embodiment, determining, based at least in part on the comparison analysis, that the object is present in the second image data and absent from the first image data includes determining that a first one or more objects detected in the first image data based at least in part on the object detection analysis does not include the object and determining that a second one or more objects detected in the second image data based at least in part on the object detection analysis includes the object.

In an example embodiment, the method for detecting presence of an object within a vehicle further includes determining an object type of the object, determining a likelihood that the object has value to the occupant, and determining that the likelihood that the object has value to the occupant exceeds a threshold value. In an example embodiment, initiating the one or more automated vehicle response measures includes at least one of: i) outputting an audio message from a speaker associated with the vehicle informing the occupant of the presence of the object in the vehicle or ii) sending a notification to a mobile device of the occupant informing the occupant of the presence of the object in the vehicle.

In an example embodiment, the method for detecting presence of an object within a vehicle further includes determining an object type of the object, determining, based at least in part on the object type, that the object is discarded material, and determining that an amount of the discarded material exceeds a threshold amount. In an example embodiment, initiating the one or more automated vehicle response measures includes assessing a punitive measure against a user profile associated with the occupant.

In an example embodiment, the method for detecting presence of an object within a vehicle further includes capturing sensor data indicative of one or more environmental characteristics of the region of the vehicle, detecting, based at least in part on the sensor data, a potential risk to the occupant caused by presence of the object in the region of the vehicle, and initiating one or more automated safety measures including at least one of: i) halting the vehicle and instructing the occupant to exit the vehicle or ii) contacting an emergency service provider.

In an example embodiment, a system for detecting presence of an object within a vehicle is disclosed. The system includes at least one processor and at least one memory storing computer-executable instructions. The at least one processor is configured to access the at least one memory and execute the computer-executable instructions to perform a set of operations including capturing first image data of a region of the vehicle prior to an occupant of the vehicle being within a first predetermined distance of the vehicle.

The set of operations further includes determining that the occupant has exited the vehicle, determining that the occupant is at least a second predetermined distance away from the vehicle, and capturing second image data of the region of the vehicle after the occupant is determined to be at least the second predetermined distance away from the vehicle. The set of operations additionally includes performing a comparison analysis of the first image data and the second image data, determining, based at least in part on the comparison analysis, that the object is present in the second image data and absent from the first image data, and initiating one or more automated vehicle response measures based at least in part on determining that the object is present in the second image data and absent from the first image data. The above-described system is further configured to perform any of the operations/functions and may include any of the additional features/aspects of example embodiments of the invention described above in relation to example computer-implemented methods of the invention.

In an example embodiment, a computer program product for detecting presence of an object within a vehicle is disclosed. The computer program product includes a non-transitory computer-readable medium readable by a processing circuit. The non-transitory computer-readable medium stores instructions executable by the processing circuit to cause a method to be performed. The method includes capturing first image data of a region of the vehicle prior to an occupant of the vehicle being within a first predetermined distance of the vehicle. The method further includes determining that the occupant has exited the vehicle, determining that the occupant is at least a second predetermined distance away from the vehicle, and capturing second image data of the region of the vehicle after the occupant is determined to be at least the second predetermined distance away from the vehicle. The method additionally includes performing a comparison analysis of the first image data and the second image data, determining, based at least in part on the comparison analysis, that the object is present in the second image data and absent from the first image data, and initiating one or more automated vehicle response measures based at least in part on determining that the object is present in the second image data and absent from the first image data. The above-described computer program product is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Overview

Figure 1:
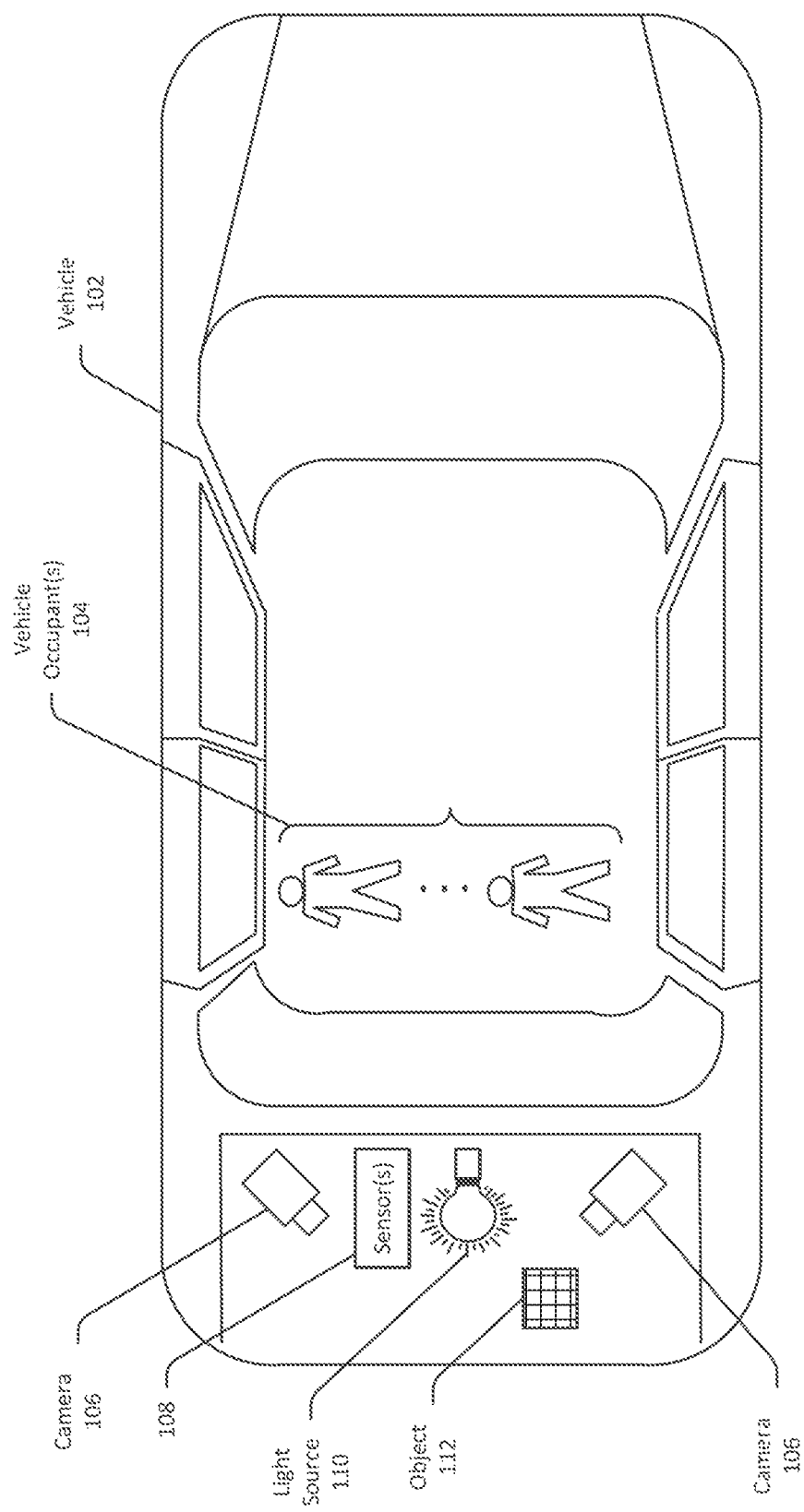
FIG. 1 illustrates an example configuration of cameras and other sensors for sensing characteristics of a cargo area of a vehicle in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments of the invention overcome technical problems specifically arising in the realm of computer-based technology, and more specifically, in the realm of autonomous vehicle technology. Autonomous vehicles are vehicles capable of making autonomous driving decisions without the aid of a human driver. In some cases, governmental regulations or the like may require that one or more humans be present in an autonomous vehicle during operation in order to potentially override autonomous operation of the vehicle if necessary to ensure vehicle occupant safety. In other cases, however, an autonomous vehicle may operate without the presence of any human capable of taking over manual control of the vehicle. For instance, an autonomous vehicle ride-sharing or taxi service may provide fully autonomous vehicles capable of transporting vehicle occupants (e.g., passengers) around without the aid of a human driver.

In example scenarios, the absence of a human driver may pose various technical problems relating to autonomous vehicle use. A human driver, particularly in connection with a taxi or ride-sharing service, may provide additional services for a passenger beyond merely operating the vehicle. These services may include, for example, assisting a passenger with placing their luggage in and removing their luggage from a cargo area of the vehicle; inspecting a cargo area or other region of a vehicle for any belongings that a passenger may have left behind after exiting the vehicle; ensuring that any material discarded by a passenger is removed from the vehicle; and so forth. This absence of a human driver in some autonomous vehicle operational settings poses technical problems with respect to performing the above-mentioned tasks, for example.

Example embodiments of the invention described herein provide technical solutions to at least the aforementioned technical problems associated with the absence of a human driver in certain autonomous vehicle operational contexts. In particular, example embodiments of the invention relate to computer-implemented methods, systems, computer program products, techniques, and methodologies for capturing image data of one or more regions of a vehicle (e.g., a cargo area of a vehicle) at various particular times and assessing the image data to determine whether a past vehicle occupant has left behind one or more belongings of value in the vehicle. In example embodiments, if it is determined that a former vehicle occupant has left behind an article of value, an audible message may be outputted from a speaker of the vehicle to inform the occupant of the presence of the article in the vehicle. For example, the audible message may be outputted while the occupant is beyond a predetermined distance from the vehicle, but still within range of hearing the message. Additionally, or alternatively, a notification may be sent to user device such as a smartphone of the former occupant. For instance, the notification may be sent to a registered mobile phone number for the former occupant, to an application executing on the former occupant's smartphone, or the like.

In example embodiments, first image data may be captured at a point in time that is prior to a soon-to-be vehicle occupant being within a predetermined distance of the autonomous vehicle. For example, as an individual is approaching the vehicle with the objective of ultimately entering the vehicle, the first image data may be captured prior to the individual entering a prescribed region around the vehicle. The first image data may be image data of a particular region of the vehicle such as, for example, a cargo area of the vehicle. While a trunk is a typical cargo area of a vehicle, it should be appreciated that any region within the vehicle (e.g., a closed compartment within a vehicle seat) can qualify as a cargo area. Further, while example embodiments may be described primarily in connection with cargo areas of a vehicle representing closed compartments within the vehicle, it should be appreciated that embodiments of the invention are applicable to any interior region of a vehicle.

In example embodiments, second image data may be captured at a point in time that coincides with the former vehicle occupant now being at least a predetermined distance away from the autonomous vehicle. For example, after an individual has completed a ride, has exited the autonomous vehicle, and is at least a predetermined distance away from the vehicle, the second image data may be captured. Similar to the first image data, the second image data may be image data of a particular region of the vehicle such as, for example, a cargo area of the vehicle. The second image data may be of a same region of the vehicle as the first image data. In example embodiments, waiting until the former vehicle occupant is at least a predetermined distance away from the vehicle provides the occupant with time to retrieve any belongings from the cargo area.

In some example embodiments, rather than triggering capture of the first image data at a point in time that is prior to a future vehicle occupant being within a predetermined distance of the vehicle, image data of the region of interest in the vehicle may be continuously captured, and selected portions of the image data (e.g., image data having a timestamp that is prior to the future vehicle occupant being within a predetermined distance of the vehicle) may be retrieved and analyzed. Similarly, rather than triggering capture of the second image data at a point in time when the vehicle occupant (now a past vehicle occupant) is at least a predetermined distance away from the vehicle, selected portions of the continuously captured image data (e.g., image data having a timestamp that coincides with when the former vehicle occupant is at least a predetermined distance of the vehicle) may be retrieved and analyzed.

In example embodiments, a comparison analysis may be performed with respect to the first image data and the second image data. In some example embodiments, the comparison analysis may include performing an object detection analysis on each of the first image data and the second image data to detect a first set of one or more objects in the first image data and/or a second set of one or more objects in the second image data. The comparison analysis may further include determining whether there is any object present in the second set of one or more objects that is not present in the first set of one or more objects. In example embodiments, if such an object is detected, it may be determined that the object is a belonging of a past vehicle occupant, and it may be presumed that the vehicle occupant inadvertently left the article in the vehicle. This presumption may be supported by the fact that the second image data is captured or otherwise corresponds to a point in time when the former vehicle occupant is at least a predetermined distance away from the vehicle, thereby allowing the former occupant enough time to have retrieved the object before the second image data was captured or retrieved.

If an object is detected that is presumed to have been left behind by a recent vehicle occupant, one or more automated vehicle response measures may be initiated. An example automated vehicle response measure may be to output an audible message from a speaker of the vehicle that informs the former vehicle occupant of the presence of the object in the vehicle. The audible message may be output while the former vehicle occupant is at least a predetermined distance away from the vehicle (to allow for the relevant second image data to be captured/retrieved and an accurate determination to be made that the object was left behind), but while the past occupant is still within range for hearing the message. In other example embodiments, an audible noise/warning may be outputted in lieu of or in addition to the audible message to draw the attention of the former vehicle occupant back to the vehicle. In other example embodiments, a notification may be sent to a mobile device of the former occupant in addition to or as an alternative to the above-mentioned forms of communication. The notification may be a short service message (SMS) sent to a registered mobile phone number for the former occupant, a message sent to the former occupant via a mobile application, an automated phone call, or the like.

In certain example embodiments, an object type of an object detected within a region of the vehicle may be determined. In example embodiments, the type of automated vehicle response measure that is taken may depend on the object type. For instance, in example embodiments, an estimate of the value of an object to the past vehicle occupant may be determined based on the object type as well as predetermined values associated with different object types. In some example embodiments, the calculated estimated value of the object may be compared to a threshold value to determine whether to notify the past occupant of the presence of the object in the vehicle. For example, the notification may only be communicated, in some example embodiments, if the estimated value of the object exceeds the threshold value. For instance, in some example embodiments, the former vehicle occupant may be notified of the object that was left behind if it is a high-value object such as a mobile phone or wallet, but may not be notified if the object is determined to be discarded material or another low-value object that was inadvertently left behind such as a drink container or the like. In some example embodiments, the value of the object may be indeterminable (e.g., a piece of paper), in which case, the former occupant may be notified that it was left behind in the vehicle. In those example embodiments in which the object is determined to be discarded material, a punitive measure may be taken against a user profile associated with the occupant. The punitive measure may include, without limitation, assessing a monetary fine against the user profile, incrementing a running count of warnings that may result in a monetary fine if a warning limit is exceeds, and so forth. In some example embodiments, the punitive measure may only be taken if the discarded material exceeds a threshold amount of material.

In certain example embodiments, additional sensor data beyond the image data may also be captured with respect to one or more interior regions of the vehicle. Such sensor data may include, without limitation, data captured by a gas sensor, data captured by a moisture sensor, infrared heat signature data captured by an infrared (IR) sensor, and so forth. For example, one or more gas sensors capable of detecting various types of gases including potentially toxic gases may be provided in a cargo area of an autonomous vehicle. If the sensor(s) detects a potential threat to a vehicle occupant (e.g., the presence of a toxic gas), the vehicle may initiate one or more automated measures such as halting the vehicle, instructing the vehicle occupant to exit the vehicle immediately, and/or contacting an emergency service provider. In some example embodiments, in addition to the first image data that is captured prior to a vehicle occupant entering the vehicle, additional image data may also be captured after the occupant has entered the vehicle, but before the occupant exits the vehicle. This image data may be evaluated to determine if the vehicle occupant placed something in a region of the vehicle (e.g., a cargo area), and if so, to potentially detect an object type of the object to assess its potential danger to vehicle occupant(s).

Example embodiments of the invention provide technical solutions to technical problems presented by the absence of a human driver in autonomous vehicle contexts. In particular, example embodiments of the invention solve technical problems relating to the absence of a human driver in an autonomous vehicle by providing automated vehicle mechanisms for performing tasks typically performed by a human driver such as detecting the presence of an object that has been left behind in the vehicle by a former vehicle occupant and communicating a message to the former occupant indicating such. In addition, example embodiments of the invention provide another technical solution to the absence of a human driver by providing automated mechanisms for detecting discarded material left behind in a vehicle by a former occupant and/or a potentially dangerous item that has been brought into the vehicle by an occupant, and initiating appropriate automated vehicle responses. These technical solutions thus constitute improvements to autonomous vehicle technology.

Illustrative Embodiments

Various illustrative embodiments of the invention will now be described in connection with the various Figures. Referring first to FIG. 1, a vehicle 102 is depicted. The vehicle 102 may be a fully autonomous vehicle capable of fully autonomous operation; a semi-autonomous vehicle capable of performing some but not all vehicle operations autonomously; or the like. In those example embodiments in which the vehicle 102 is a fully autonomous vehicle, no human driver may be present in the vehicle 102. The vehicle 102 may be any suitable type of vehicle including, without limitation, a car; a truck; a vehicle with more than two axles; an armored vehicle; a two-wheeler vehicle; or the like.

One or more vehicle occupants 104 are illustratively depicted as being present in the vehicle 102. In some example embodiments, multiple occupants 104 may be present in the vehicle 102. In other example embodiments, a single occupant 104 may be present in the vehicle 102. In some example embodiments, the vehicle 102 may be an autonomous vehicle operated as part of a ride-sharing or taxi service (e.g., a robo-taxi). Various occupants 104 may enter and exit the vehicle at different times, and in some cases, multiple occupants 104 may share the vehicle 102 as they are transported to their respective destinations.

In example embodiments, a vehicle occupant 104 may enter the vehicle 102 along with one or more objects in the occupant's possession. In some example embodiments, a vehicle occupant 102 may place an item in her possession in a cargo area of the vehicle 102, which may be any enclosed space within the vehicle 102. While example embodiments of the invention may be described with respect to monitoring of a cargo area, it should be appreciated that such example embodiments are applicable to any region of the vehicle 102.

An illustrative cargo area of the vehicle 102 is depicted in FIG. 1 as including multiple cameras 106. The cameras 106 may be positioned/located so as to cumulatively provide a substantially complete field-of-view (FOV) of the cargo area. While two camera 106 are illustratively shown, it should be appreciated that any number of cameras 106 may be provided. In some example embodiments, one or more of the cameras 106 may be adapted to rotate, move axially, or the like within the cargo area so as to obtain image data from different vantage points. In example embodiments, the cameras 106 may be configured to capture a continuous stream of video data of the cargo area. In other example embodiments, the cameras 106 may be configured to capture images at specified times and/or at a specified capture rate.

In example embodiments, a light source 110 may be provided as well in the cargo area. The light source 110 may be continuously illuminated if, for example, the cameras 106 capture a continuous stream of video data, or may be periodically switched on at specified times or in accordance with a specified capture rate of the cameras 106. The cargo area may further include one or more objects 112. In some example embodiments, one or more of the vehicle occupants 104 may have brought one or more of the objects 112 into the vehicle 102 and placed them in the cargo area. In some example embodiments, one or more of the objects 112 may have been in the cargo area prior to any of the vehicle occupants 104 entering the vehicle 102. For example, one or more of the objects 112 may have been intentionally placed in the cargo area by a service provider (e.g., a first-aid kit) or may have unintentionally (or intentionally) placed their by a former occupant of the vehicle 102. In addition, the cargo area may include one or more additional types of sensors 108. The sensor(s) 108 may include, without limitation, a moisture sensor, a gas sensor, an IR sensor, a smoke sensor, a heat sensor, or the like. These additional sensor(s) 108 may capture sensor data continuously or at periodic intervals. The sensor(s) 108 may capture sensor data prior to an occupant 104, during the occupant's 104 presence in the vehicle 102, and/or after the occupant 104 has exited the vehicle.

Figure 2A:
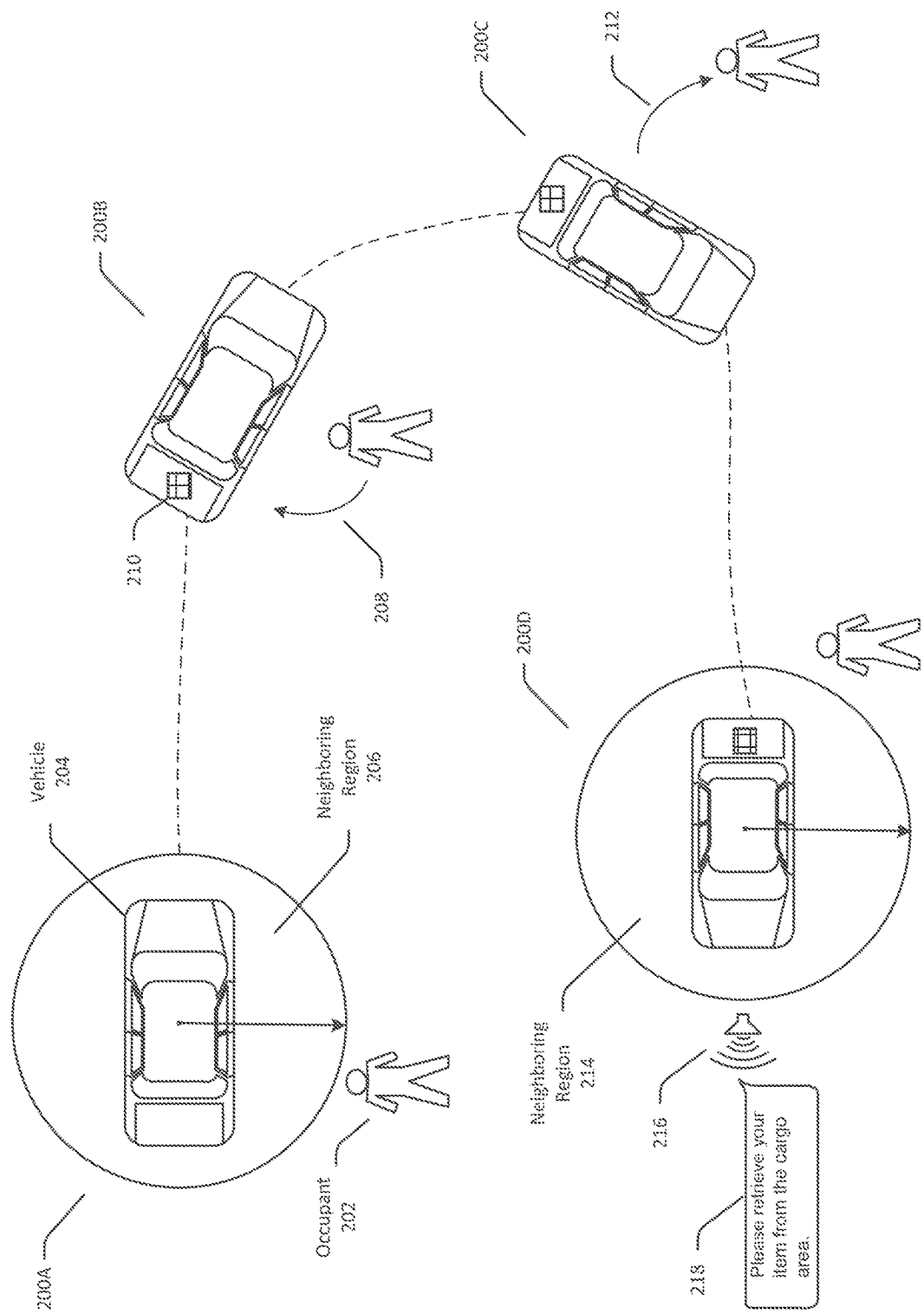
FIG. 2A illustrates an example scenario in which cargo cameras and image analysis are used to determine and inform a past occupant who has exited a vehicle that he/she has left behind an object of value in the vehicle in accordance with an example embodiment of the invention.
Figure 2B:
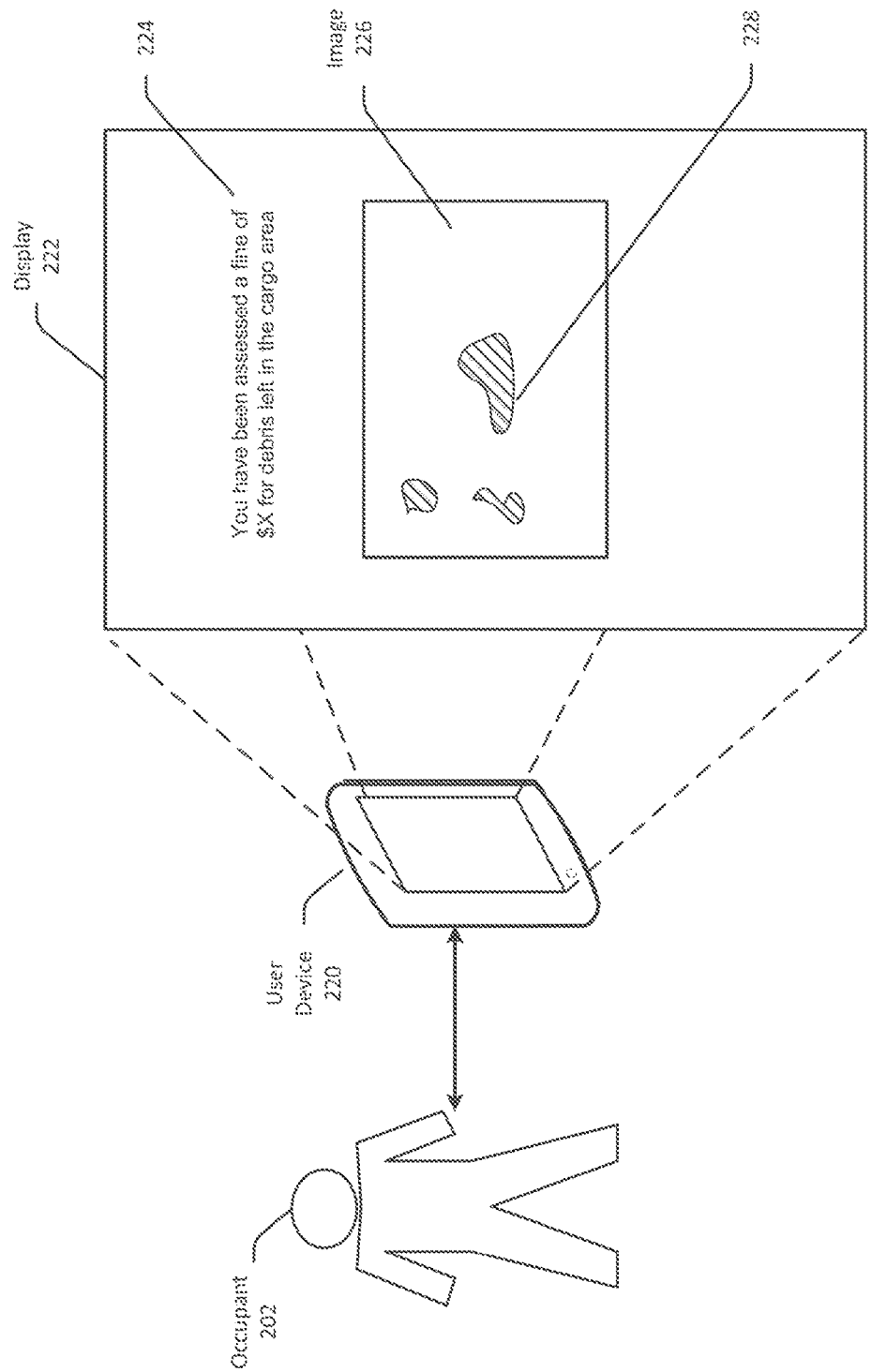
FIG. 2B illustrates an example scenario in which cargo cameras and image analysis are used to determine that a past occupant of the vehicle has engaged in conduct with respect to the vehicle that warrants a punitive measure in accordance with an example embodiment of the invention.
Figure 2C:
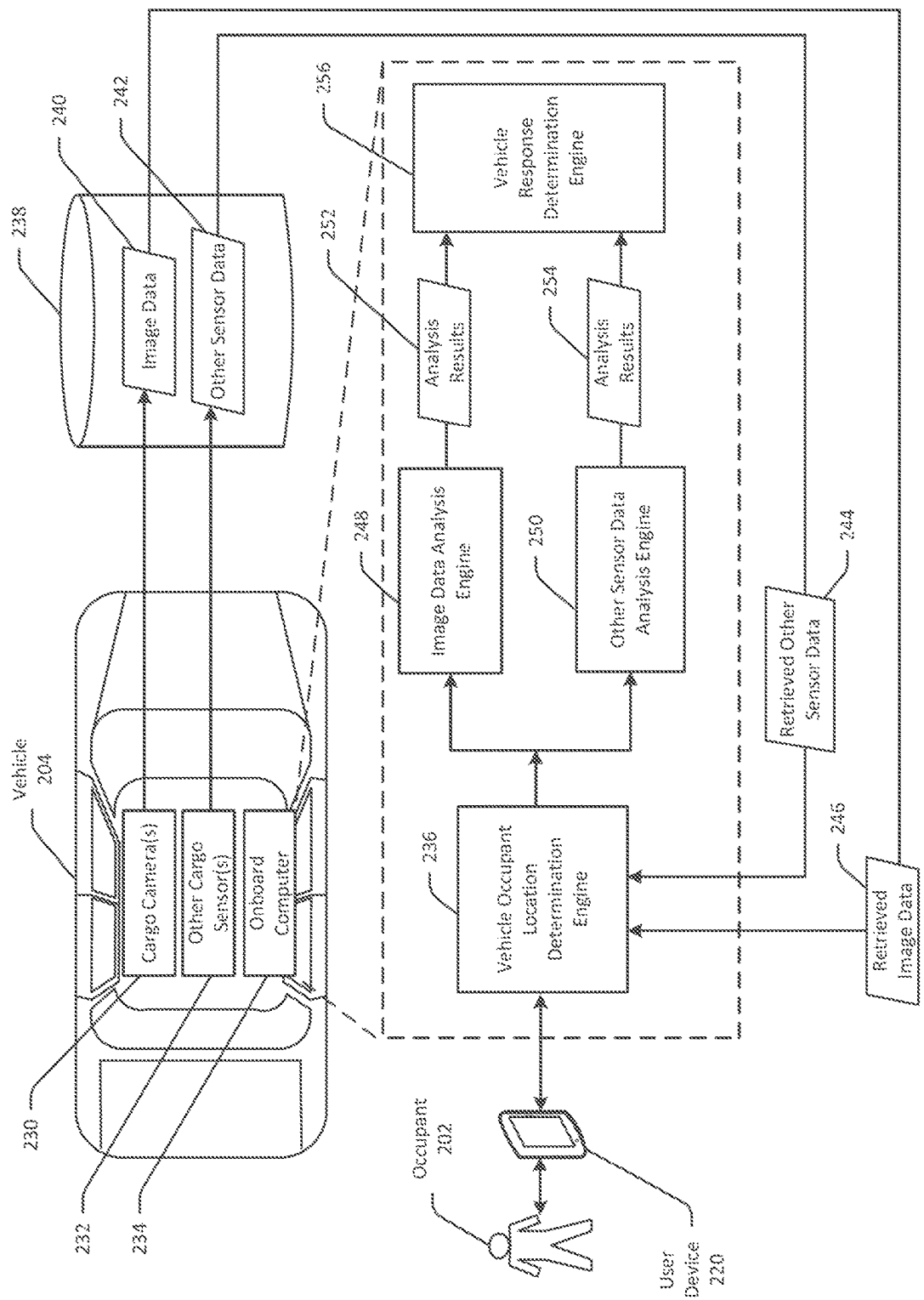
FIG. 2C is a data flow and block diagram illustrating a process for detecting one or more objects in a cargo area of a vehicle and initiating one or more automated vehicle response measures based on the detected object(s) in accordance with an example embodiment of the invention.
Figure 3:
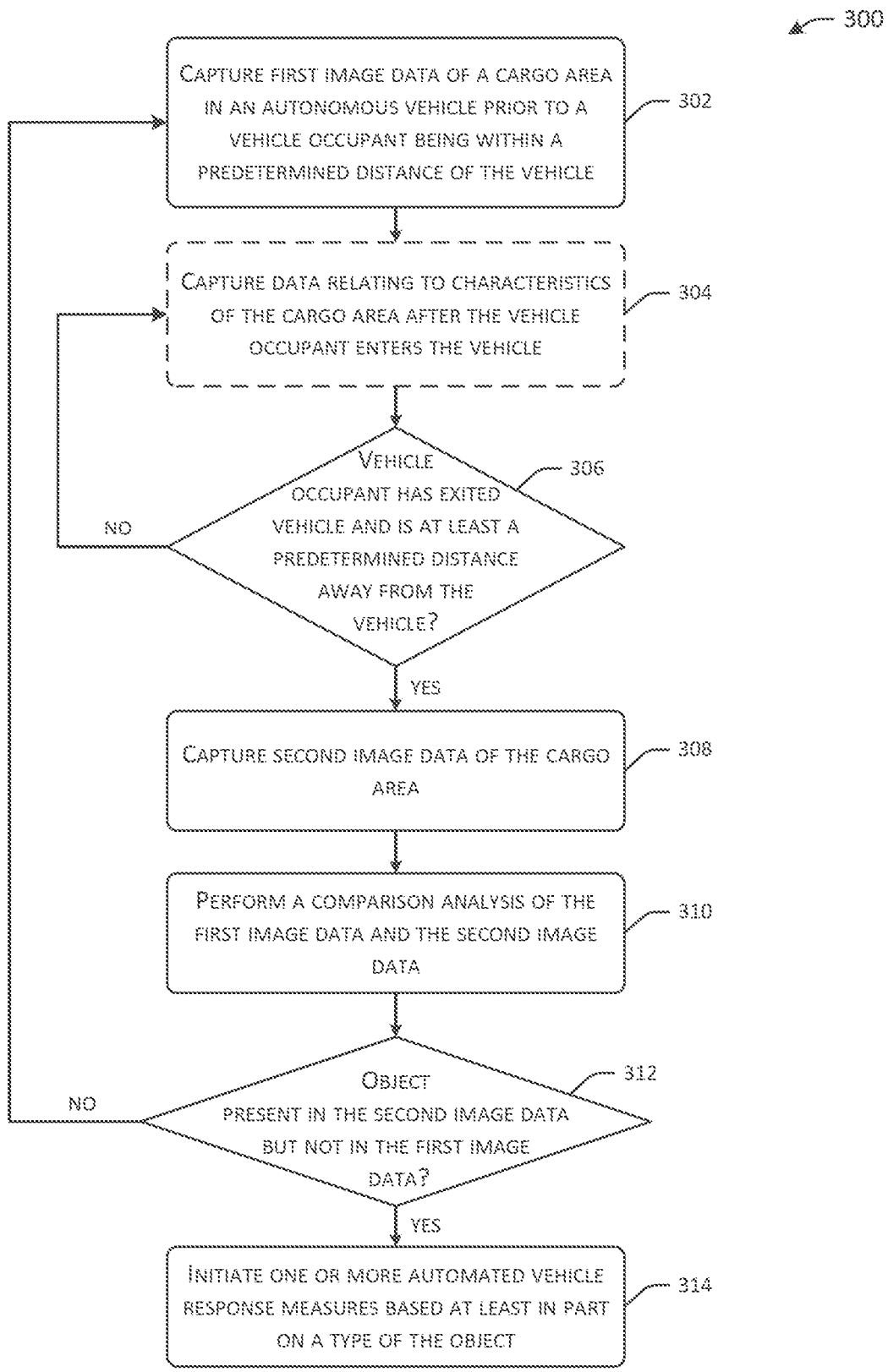
FIG. 3 is a process flow diagram of an illustrative method for detecting one or more objects in a cargo area of a vehicle and initiating one or more automated vehicle response measures based on the detected object(s) in accordance with an example embodiment of the invention.

FIG. 2C is a data flow and block diagram illustrating a process for detecting one or more objects in a cargo area of a vehicle and initiating one or more automated vehicle response measures based on the detected object(s) in accordance with an example embodiment of the invention. FIG. 3 is a process flow diagram of an illustrative method 300 for detecting one or more objects in a cargo area of a vehicle and initiating one or more automated vehicle response measures based on the detected object(s) in accordance with an example embodiment of the invention. FIGS. 2C and 3 will be described in conjunction with one another hereinafter.

Each operation of any of the methods 300, 400, and/or 500 (which will be described later in this disclosure) can be performed by one or more of the engines/program modules depicted in FIG. 1 or 8, whose operation will be described in more detail hereinafter. These engines/program modules can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring now to FIG. 3 in conjunction with FIG. 2C, at block 302 of the method 300, first image data of a cargo area of an autonomous vehicle 204 may be captured at a point in time that is prior to a soon-to-be vehicle occupant 202 being within a predetermined distance of the autonomous vehicle 204. The vehicle 204 may be a particular implementation of the vehicle 102 depicted in FIG. 1. For example, as an individual 202 is approaching the vehicle 204 with the objective of ultimately entering the vehicle 204, the first image data may be captured prior to the individual 402 entering a prescribed region around the vehicle 204. FIG. 2A illustrates an example scenario according to embodiments of the invention in which the vehicle 204 passes through multiple stages 200A-200D while it traverses at least a portion of travel path that begins prior to the occupant 202 entering the vehicle 204 and continues to the occupant 202 being at least a predetermined distance away from the vehicle 204 after exiting the vehicle 204.

At stage 200A, the first image data may be captured prior to the occupant entering a neighboring region 206 around the vehicle 204. The region 206 may be, in some example embodiments, bounded by a circle having its center at a substantially central location of the vehicle 204 and a predetermined radius. In some example embodiments, the capture of the first image data may be triggered at a point in time that is prior to the future vehicle occupant 202 entering the region 206. In particular, in some example embodiments, capture of the first image data may occur while the future occupant 202 is outside the region 206, but within a predetermined distance from the boundary of the region 206. In this manner, the first image data may be captured at a point in time when the future occupant 202 is near the vehicle 204 but still outside the prescribed region 206.

Referring again to FIG. 2C, the captured first image data may be stored as a portion of the image data 240 in one or more datastores 238. In some example embodiments, rather than triggering capture of the first image data at a point in time that is prior to a future vehicle occupant 202 being within a predetermined distance of the vehicle 204 (i.e., prior to the occupant 202 entering the region 206), the image data 240 of the cargo area (or other interior region of the vehicle 204) may be continuously captured, and selected retrieved portions of the image data 246 (e.g., image data having a timestamp that is prior to the future vehicle occupant 202 being within a predetermined distance of the vehicle 204) may be retrieved and analyzed.

Referring again to FIG. 2A, at stage 200B, the occupant 202 may enter 208 the vehicle 204. In some example embodiments, the occupant 202 may bring one or more objects 210 (referred to in the singular hereinafter for ease of explanation) into the vehicle 204. In particular, in some example embodiments, the occupant 202 may place the object 210 in a cargo area of the vehicle 204, illustratively depicted as a trunk area in FIG. 2A. Now referring to FIG. 2C, and as previously described in reference to FIG. 1, the vehicle 204 may include one or more cameras 230 that may be provided in a cargo area (or other interior region) of the vehicle 204. The cameras 230 may represent a particular implementation of the cameras 106 depicted in FIG. 1. The cameras 230 may be positioned so as to cumulatively provide a substantially complete FOV of the cargo area. The cameras 230 may capture image data of the cargo area continuously, periodically, or when specifically triggered to, as will be described in more detail in reference to later operations of the method 300. In addition, referring again to FIG. 2C, in some example embodiments, other cargo sensor(s) 232 such as moisture sensors, heat sensors, IR sensors, gas sensors, smoke sensors, or the like may also be provided in the cargo area to capture additional forms of sensor data.

Referring again to FIG. 3 in conjunction with FIG. 2C, at block 304 of the method 300, the other sensor(s) 232 may optionally capture data 242 relating to characteristics of the cargo area of the vehicle 204. The other sensor data 242 may be stored in the datastore(s) 238. As previously noted, the sensor data 242 captured by the sensors 232 may include gas toxicity data, gas concentration data, moisture data, heat/temperature data, IR signature data, relative humidity data, or the like. In some example embodiments, the sensor(s) 232 may capture the data 242 continuously regardless of the whether the vehicle 204 is in motion and/or whether occupant(s) are present in the vehicle 204. In other example embodiments, the sensor(s) 232 may periodically capture the data 242 and/or may be triggered to capture the data 242 after an occupant (e.g., the occupant 202) enters the vehicle 204, with the objective in the latter scenario being to capture sensor data relating to any objects an occupant may have brought into the vehicle 204.

At block 306 of the method 300, a determination may be made as to whether the occupant 202 has exited the vehicle 204 and is at least a predetermined distance away from the vehicle 204. In example embodiments, the vehicle 204 may be equipped with an onboard computer 234 (e.g., an electronic control unit of the vehicle 204 or other computing device integrated with the vehicle 204) that is configured to perform various processing relating to example embodiments of the invention via one or more processing engines. In particular, the onboard computer 234 may be configured to execute a vehicle occupant location determination engine 236, an image data analysis engine 248, an other sensor data analysis engine 250, and a vehicle response determination engine 256. These various engines may include any respective combination of software, firmware, and/or hardware configured to corresponding tasks. For example, the vehicle occupant location determination engine 236 may be executed to make the determination at block 306. While the computing device 234 is described herein as an onboard computer, it should be appreciated that some or all of the processing described as being performed by the onboard computer 234 may instead be performed in a remote environment (e.g., a cloud environment), and results of the processing may be communicated to the onboard computer 234.

Referring again to block 306 of the method 300, the engine 236 may be executed to determine a current location of the occupant 202. For instance, the engine 236 may determine the occupant's 202 location based on a Global Positioning System (GPS) location of a user device 220 of the occupant's 202, which may be communicated from a GPS receiver integrated with the user device 220 to the onboard computer 234. The onboard computer 234 may receive the GPS location of the user device 220 and compare the GPS coordinates to a current location of the vehicle 204 to determine if the location of the user device 220 is at least the predetermined distance away from the vehicle 204 (i.e., a positive determination at block 306).

For instance, referring again to FIG. 2A, at stage 200C, the occupant 202 may exit 212 the vehicle 204. As the now former vehicle occupant 202 walks farther away from the vehicle 204, at some point, the former vehicle occupant 202 will be at least a predetermined distance away from the vehicle 204, as shown in stage 200D. More specifically, the predetermined distance at stage 200D is defined by a region 214 having a circular perimeter with a center corresponding to a substantially central position of the vehicle 204 and a defined radius. In particular, the predetermined distance at stage 200D may be the radius of the region 214. In some example embodiments, the occupant 202 may be deemed to be at least the predetermined distance away from the vehicle 204 for the purposes of a positive determination at block 306 if the occupant 202 is outside of the region 214. The predetermined distance at stage 200A may be the same as or may differ from the predetermined distance at stage 200D. Stated another way, the radii of the regions 206 and 214 may be the same or may differ. In some example embodiments, the radius of the region 214 may be greater than the radius of the region 206 to allow the occupant 202 an opportunity to return to the vehicle 204 if the occupant has left behind an object (e.g., the object 210) in the vehicle 204.

Referring now to FIG. 3 in conjunction with FIGS. 2A and 2C, in example embodiments, the engine 236 may make a negative determination at block 306 if, for example, the vehicle occupant 202 has not exited 212 the vehicle 204 or if the occupant 202 (now former occupant) has exited 212 the vehicle 204, but has not reached at least a predetermined distance from the vehicle 204. In response to a negative determination at block 306, the method 300 may proceed again to option block 304 or block 302. On the other hand, in response to a positive determination at block 306, the method 300 may proceed to block 308, where second image data may be captured at a point in time that coincides with the former vehicle occupant 202 now being at least a predetermined distance away from the autonomous vehicle 204 (i.e., being outside of the region 214).

For example, after the occupant 202 has completed a ride in the vehicle 204, has exited 212 the vehicle 204, and is at least a predetermined distance away from the vehicle 204 (e.g., outside the region 214), the second image data may be captured and stored as at least a portion of the image data 240. Similar to the first image data, the second image data may be image data captured by the cameras 230 of a particular region of the vehicle 204 such as, for example, a cargo area of the vehicle 204. The second image data may be of a same region of the vehicle 204 as the first image data. Similar to the first image data, rather than triggering capture of the second image data at a point in time when the vehicle occupant 202 (now a past vehicle occupant) is at least a predetermined distance away from the vehicle 204, selected portions 246 of continuously captured image data (e.g., image data having a timestamp that coincides with when the former vehicle occupant 202 is at least a predetermined distance of the vehicle 204) may be retrieved and analyzed.

In example embodiments, at block 310 of the method 300, a comparison analysis may be performed with respect to the first image data and the second image data. More specifically, in example embodiments, the image data analysis engine 248 may receive the first image data and the second image data from the vehicle occupant location determination engine 236 and perform the comparison analysis. Referring again to FIGS. 2A and 2C together, as previously noted, in some example embodiments, the cameras 230 may continuously capture image data 240 of the cargo area of the vehicle 204 and store the image data 240 in the datastore(s) 238. The vehicle occupant location determination engine 236 may then retrieve portions 246 of the image data stored in association with respective timestamps corresponding to a point in time when the occupant 202 is outside the region 206 prior to entering the vehicle 204 (for the first image data) and a point in time when the occupant 202 (now former occupant) has exited the vehicle 204 is outside the region 214 (for the second image data).

Alternatively, the cameras 230 may be triggered to capture the first image data and the second image data at specific times in response to commands received from the vehicle occupant location determination engine 236. For instance, when the engine 236 determines that the occupant 202 is outside of the region 206 prior to entering the vehicle 204, the engine 236 may trigger the cameras 230 to capture the first image data. Similarly, when the engine 236 makes a positive determination at block 306, the engine 236 may trigger the cameras 230 to capture the second image data. In such example embodiments, the first image and the second image data may be directly sent to the image analysis engine 248 rather than being relayed to the engine 248 via the engine 236.

In some example embodiments, the comparison analysis performed at block 310 may include performing an object detection analysis on each of the first image data and the second image data to detect a first set of one or more objects in the first image data and/or a second set of one or more objects in the second image data. The comparison analysis may further include determining, at block 312 of the method 300, whether there is any object present in the second set of one or more objects that is not present in the first set of one or more objects. The analysis results 252 of the comparison analysis performed by the image data analysis engine 248 may be provided to the vehicle response determination engine 256. In example embodiments, if the analysis results 252 indicate that such an object was detected during the comparison analysis (e.g., a positive determination at block 312), the method 300 may proceed to block 314, where the vehicle response determination engine 256 may initiate one or more automated vehicle response measures based at least in part on an object type of the detected object.

In particular, if an object (e.g., the object 210) is detected as being present in the second image data but not in the first image data, it may be determined that the object is a belonging of a past vehicle occupant (e.g., the occupant 202), and it may be presumed that the former vehicle occupant 202 inadvertently left the article 210 in the vehicle 204. This presumption may be supported by the fact that the second image data is captured or otherwise corresponds to a point in time when the former vehicle occupant 202 is at least a predetermined distance away from the vehicle 204, thereby allowing the former occupant 202 enough time to have retrieved the object 210 before the second image data was captured or retrieved. If an object (e.g., the object 210) is detected that is presumed to have been left behind by a recent vehicle occupant (e.g., occupant 202), one or more automated vehicle response measures may be initiated. Example automated vehicle response measures that can be taken will be described in more detail hereinafter in reference to FIG. 4.

Figure 4:
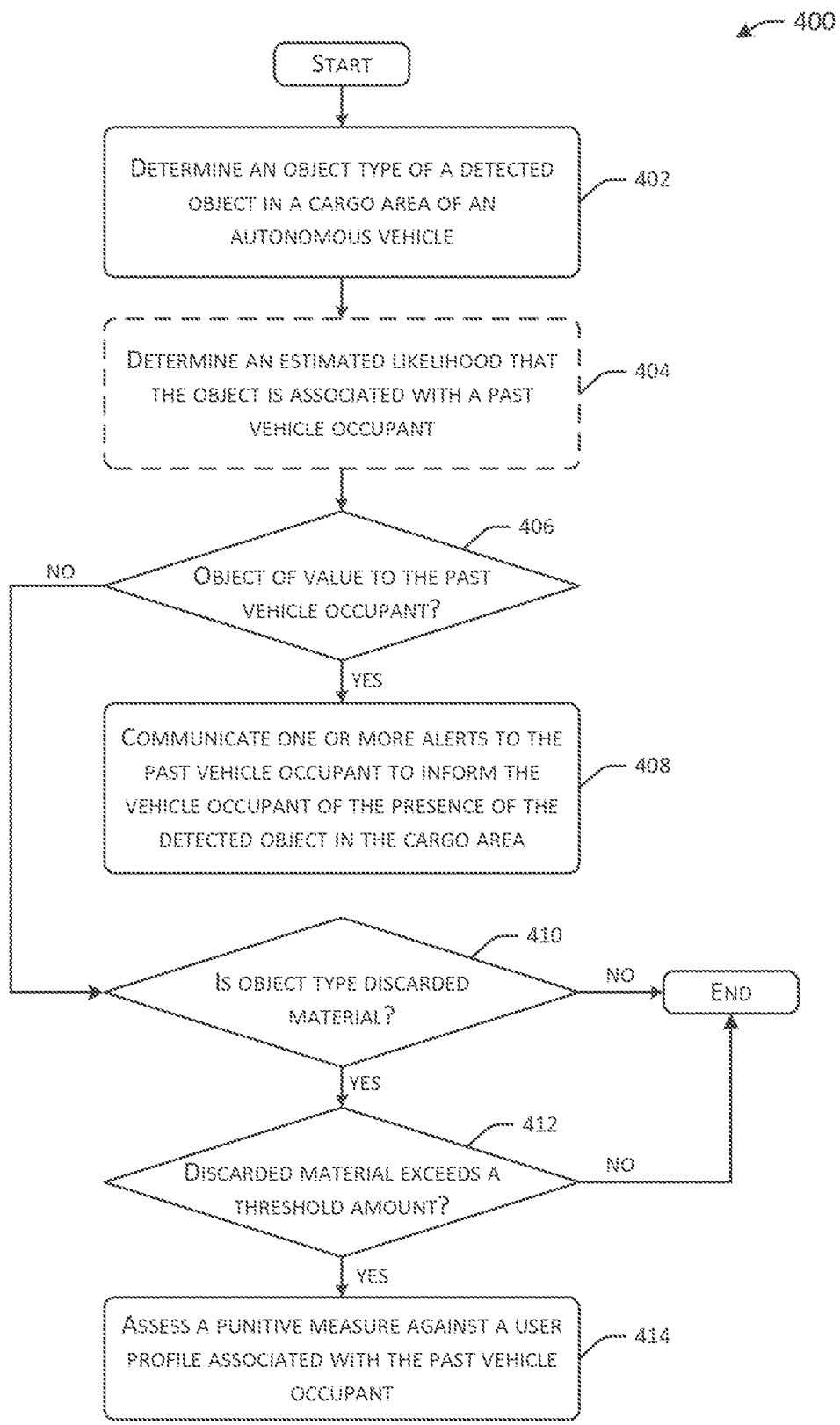
FIG. 4 is a process flow diagram of an illustrative method for determining an object type of an object detected in a cargo area of a vehicle and taking various vehicle response measures based on the object type in accordance with an example embodiment of the invention.

Referring now to FIG. 4 in conjunction with FIG. 2A, an object type of the object 210 may be determined. In example embodiments, the type of automated vehicle response measure that is taken depends on the object type of the object 210. More specifically, assuming that the object 210 serves as the basis for a positive determination at block 312 of the method 300 of FIG. 3, the image data analysis engine 240, for example, may perform an object identification analysis to identify an object type of the object 210. In some example embodiments, the image data analysis engine 240 may employ one or more machine learning models/algorithms including any type of supervised and/or unsupervised learning to train a classifier to perform the object type identification on the second image data.

Then, in some example embodiments, one or more engines of the onboard computer 234 may optionally estimate a likelihood that the object 210 is associated with a past vehicle occupant (e.g., the occupant 202). This may include searching for image data that includes both the past vehicle occupant 202 and the object 210 in the same image frame and/or in at least some threshold number of consecutive image frames. As another non-limiting example, determining an estimate of a likelihood that the object 210 is associated with the particular former vehicle occupant 202 may include comparing respective timestamps associated with different locations of the occupant 202 (as determined based on GPS locations of the user device 220) with respect to the vehicle 204 and timestamps associated with the object 210 being detected in the image data 240 captured by the cameras 230. If these timestamps are determined to have specific relationships with respect to one another, the estimated likelihood that the object 210 is associated with the occupant 202 may be relatively high. For instance, if the occupant 202 is detected to be within a certain distance of the vehicle 204 prior to the object 210 appearing in the image data, and then is detected to be at a greater distance from the vehicle 204 after the object 210 appears in the image data and prior to the occupant 202 being detected as being inside the vehicle 204, the likelihood of association between the object 210 and the occupant 202 may be greater because it may be presumed that the occupant 202 is the one who placed the object 210 in the cargo area (e.g., trunk) of the vehicle 402.

Referring again to FIG. 4, in example embodiments, an estimate of the value of an object 210 to the past vehicle occupant 202 may be determined at block 406 of the method 400 based on the object type as well as based on predetermined values associated with different object types. In some example embodiments, the calculated estimated value of the object 210 may be compared to a threshold value at block 406 to determine whether to notify the past occupant 202 of the presence of the object 210 in the vehicle 204. For instance, in some example embodiments, a notification may only be communicated to the past occupant 202 if the estimated value of the object 210 exceeds the threshold value. For instance, in some example embodiments, the former vehicle occupant 202 may be notified that the object 210 was left behind in the vehicle 204 if it is a high-value object such as a mobile phone or wallet, but may not be notified if the object 210 is determined to be discarded material or another low-value object that was inadvertently left behind. In some example embodiments, the value of the object 210 may be indeterminable (e.g., a piece of paper), in which case, the default setting may be to notify the former occupant 202 that it was left behind in the vehicle 204.

In response to a positive determination at block 406, the vehicle response determination engine 256 may initiate an example automated vehicle response measure, which may include communicating one or more alerts to the past vehicle occupant 202 to inform the occupant 202 of the presence of the detected object 210 in the cargo area of the vehicle 204. For instance, referring to FIG. 2A, in an example embodiment, the engine 256 may output an audible message 218 from a speaker 216 of the vehicle 204 that informs the former vehicle occupant 202 of the presence of the object 210 in the vehicle 204. The audible message 218 may be output while the former vehicle occupant 202 is at least a predetermined distance away from the vehicle 204 (to allow for the relevant second image data to be captured/retrieved and an accurate determination to be made that the object 210 was in fact left behind by the former occupant 202), but while the former occupant 202 is still within range of hearing the message 218. In other example embodiments, an audible noise/warning may be outputted in lieu of or in addition to the audible message 218 to draw the attention of the former vehicle occupant 202 back to the vehicle 204. In yet other example embodiments, a notification may be sent to the mobile device 220 of the former occupant 202 in addition to or as an alternative to the above-mentioned forms of communication. The notification may be a short service message (SMS) sent to a registered mobile phone number for the former occupant 202, a message sent to the former occupant 202 via a mobile application executing on the user device 220, an automated phone call to the user device 220, or the like.

Referring again to block 406, if, on the other hand, a determination is made that the object 210 does not have sufficient value to inform the former vehicle occupant 202 that it was left behind in the vehicle 204, the method 400 may proceed to block 410, where it may be determined whether the object type of the object 210 is discarded material. As described earlier, supervised, unsupervised, and/or partially-supervised training algorithms may be executed to train a classifier to detect object types of various objects. Once an object is detected, a stored database that associates a "discarded" tag or the like with various object types may be consulted to determine whether the detected object 210 is a "discarded" object type. In some example embodiments, if the object type of the detected object 210 is determined not to be a discarded material, the method 400 may end.

In other example embodiments, however, if the detected object 210 is determined to be an object type tagged as discarded material (a positive determination at block 410), the method 400 may proceed to block 412, where a determination may be made as to whether an amount of the discarded material exceeds a threshold amount. In response to a negative determination at block 412, the method 400 may end. On the other hand, in response to a positive determination at block 412, the method 400 may proceed to block 414, where the vehicle response determination engine 256 may initiate a vehicle response measure in the form of a punitive measure taken against a user profile associated with the former occupant 202. The punitive measure may include, without limitation, assessing a monetary fine against the user profile, incrementing a running count of warnings that may result in a monetary fine if a warning limit is exceeds, and so forth.

FIG. 2B illustrates an example in which a punitive measure is assessed in accordance with an example embodiment of the invention. As depicted, various content may be displayed on a display 222 of the mobile device 220 associated with the occupant 202 upon determining that a vehicle response measure in the form of a punitive measures is to be taken. The content may be delivered, for example, to a mobile application downloaded to and executing on the user device 220. The mobile application may be provided, for example, by a service provider that operates the vehicle 204 as part of a ride-sharing or taxi service. The content may include a message 224 indicative of the punitive measure that is being assessed against the occupant's 202 user profile. The message 224 may indicate, for example, that a fine is being assessed for leaving discarded material in the vehicle 204 and the amount of the fine. In some example embodiments, the content may further include an image 226 taken of the cargo area (or other interior region of the vehicle 204) in which the material was discarded. In some example embodiments, bounding boxes or other graphical indicia may be presented as overlays on the image 224 to identify the relative location(s) of the discarded material within the cargo area.

Figure 5:
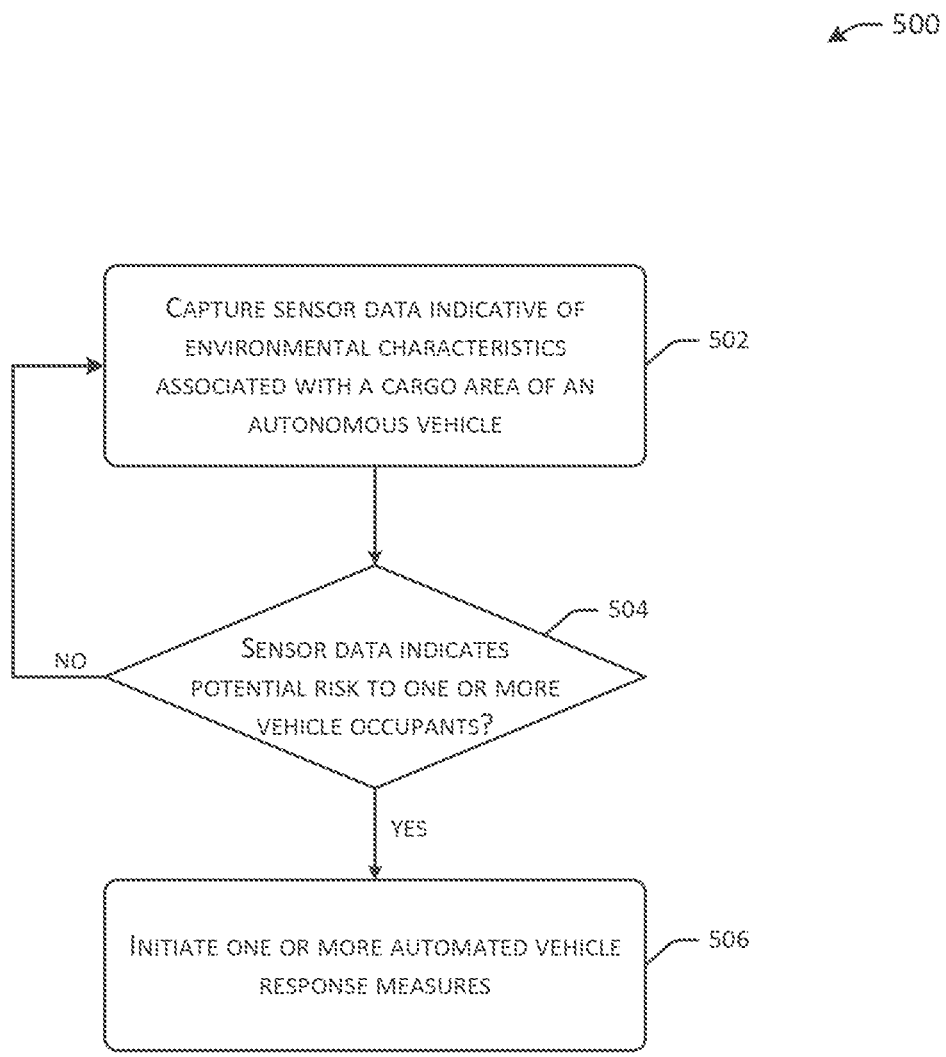
FIG. 5 is a process flow diagram of an illustrative method for determining a potential risk to vehicle occupants based on detected conditions in a cargo area of a vehicle and initiating a vehicle response measure in response thereto in accordance with an example embodiment of the invention.

FIG. 5 is a process flow diagram of an illustrative method 500 for determining a potential risk to vehicle occupants based on detected conditions in a cargo area of a vehicle and initiating a vehicle response measure in response thereto in accordance with an example embodiment of the invention. Referring to FIG. 5 in conjunction with FIG. 2C, at block 502 of the method 500, sensor data indicative of environment characteristics associated with a cargo area (or other interior region) of the vehicle 204 may be captured. The sensor data captured at block 502 may be, for example, the other sensor data 242 captured at block 404 of the method 400 of FIG. 4. In example embodiments, the sensor data captured at block 502 (e.g., the other sensor data 242) may include, without limitation, data captured by a gas sensor, data captured by a moisture sensor, IR heat signature data captured by an IR sensor, and so forth.

At block 504 of the method 500, a determination may be made as to whether the sensor data captured at block 502 indicates a potential risk to one or more occupants of the vehicle 204. More specifically, in some example embodiments, the other sensor data analysis engine 250 may receive the other sensor data 244 (potentially via the vehicle occupant location determination engine 236) and may assess whether the sensor data 244 is indicative of a potential threat to one or more occupants (e.g., occupant 202) of the vehicle 204. In some example embodiments, the vehicle occupant location determination engine 236 may trigger the other cargo sensor(s) 232 to capture the sensor data at block 502 responsive, at least in part, to determining that the vehicle occupant 202 has entered the vehicle 204, in which case, captured sensor data 244 may be provided directly as input to the other sensor data analysis engine 250. In other example embodiments, the other sensor data 242 may be continuously captured, and the engine 236 may retrieve (as the retrieved other sensor data 244) a portion of the data 244 that is associated with timestamps beginning or occurring shortly after the occupant 202 entered the vehicle 204 and while the occupant is traveling in the vehicle 204.

In some example embodiments, in addition to the first image data that is captured prior to the vehicle occupant 202 entering the vehicle 204, additional image data may also be captured at block 502 after the occupant 202 has entered the vehicle 204, but before the occupant 202 exits the vehicle 204. This image data may be evaluated at block 504 to determine if the vehicle occupant 202 placed something in a region of the vehicle (e.g., a cargo area), and if so, to potentially detect an object type of the object to assess its potential danger to vehicle occupant(s) of the vehicle 204 (e.g., one or more vehicle occupants other than the occupant 202). For example, the sensor(s) 230 may include one or more gas sensors capable of detecting various types of gases including potentially toxic gases. In some example embodiments, if the gas sensors detect a toxic gas concentration above a threshold amount (potentially for at least a threshold duration of time), a positive determination may be made at block 504, and the method 500 may proceed to block 506. In some example embodiments, a gas sensor may be, for example, a gas chromatograph which produces data that the other sensor data analysis engine 250 is capable of interpreting to determine the chemical composition of the detected gas(es).

The engine 250 may provide its analysis results 254 to the vehicle response determination engine 256, which may initiate one or more automated measures at block 506 based at least in part on the analysis results 254. Such automated vehicle response measures may include, without limitation, halting the vehicle 204, instructing the vehicle occupant 202 and/or one or more additional vehicle occupants to exit the vehicle 204 immediately, and/or contacting an emergency service provider such as a police, fire, and/or ambulatory service provider.

Hardware Implementation

Figure 6:
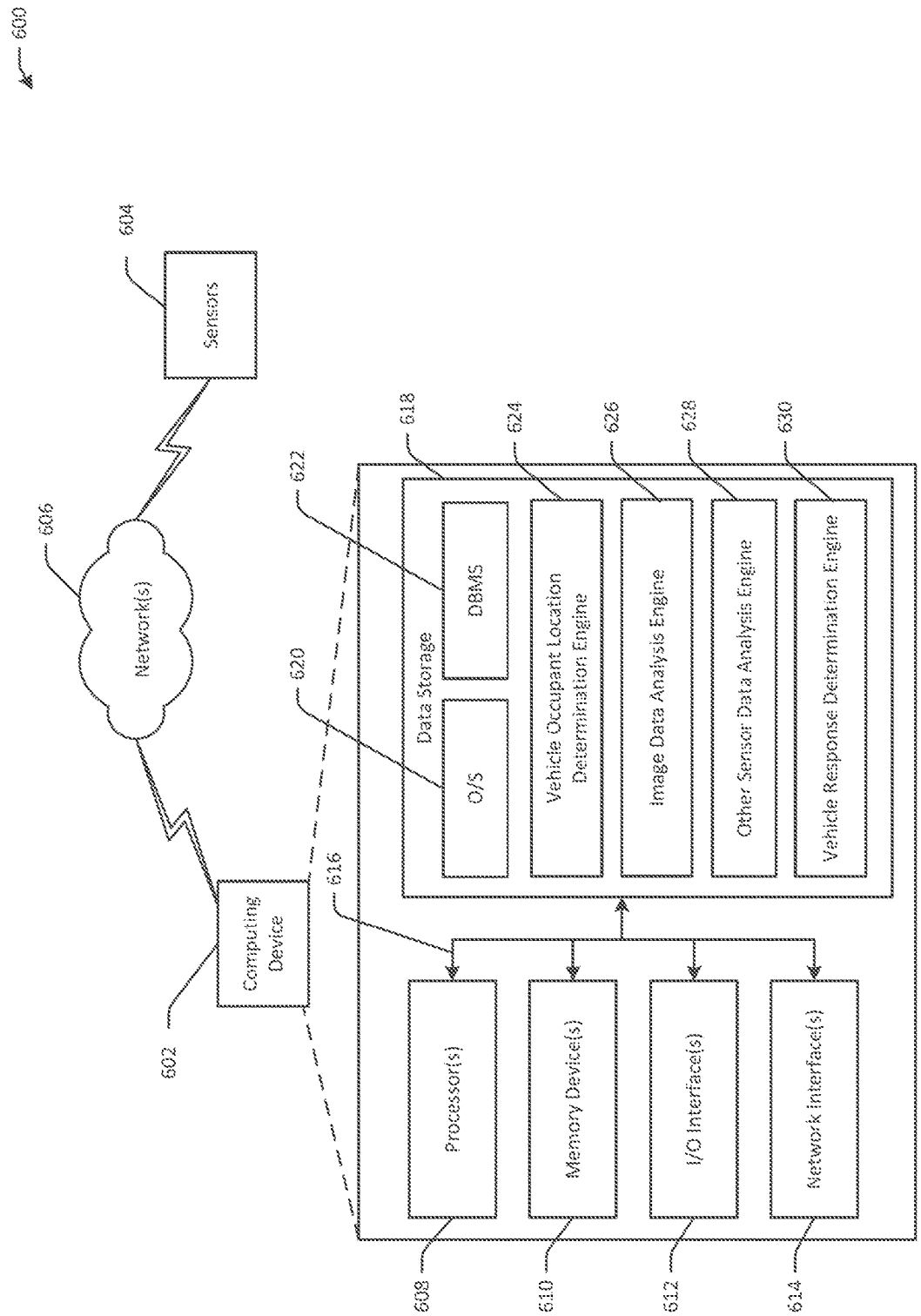
FIG. 6 is a schematic block diagram illustrating an example networked architecture configured to implement example embodiments of the invention.

FIG. 6 is a schematic block diagram illustrating an example networked architecture 600 configured to implement example embodiments of the invention. The networked architecture 600 can include one or more special-purpose computing devices 602 communicatively coupled via one or more networks 606 to various sensors 604. The sensors 604 may include any of a variety of types of on-board vehicle sensors that may be provided with an autonomous vehicle including, without limitation, Light Detecting and Ranging (LiDAR) sensors, radars, cameras, GPS receivers, sonar-based sensors, ultrasonic sensors, microphones, inertial measurement units (IMUs), accelerometers, gyroscopes, magnetometers, IR sensors, and so forth. In example embodiments, the sensors 604 may include on-board sensors provided on an exterior or in an interior of a vehicle (e.g., vehicle 102, vehicle 204) such as an autonomous vehicle. The special-purpose computing device(s) 602 may include devices that are integrated with a vehicle and may receive sensor data from the sensors 604 via a local network connection (e.g., WiFi, Bluetooth, Dedicated Short Range Communication (DSRC), or the like). In other example embodiments, the special-purpose computing device(s) 602 may be provided remotely from a vehicle and may receive the sensor data from the sensors 604 via one or more long-range networks.

The special-purpose computing device(s) 602 may be hard-wired to perform the techniques of example embodiments of the invention; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 602 may also combine custom hard-wired logic, ASICs, or FPGAs with custom programming to accomplish the techniques. The special-purpose computing device(s) 602 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 620, such as iOS, Android, Chrome OS, various versions of the Windows operating system (e.g., Windows XP, Windows Vista, Windows 7, Windows 8, Windows Server, Windows CE, etc.), Unix, Linux, SunOS, Solaris, iOS, Blackberry OS, VxWorks, or other compatible operating systems. In other embodiments, the computing device(s) 602 may be controlled by a proprietary operating system. The operating system software 620 may control and schedule computer processes for execution; perform memory management; provide file system, networking, and I/O services; and provide user interface functionality, such as a graphical user interface ("GUI").

While the computing device(s) 602 and/or the sensors 604 may be described herein in the singular, it should be appreciated that multiple instances of any such component can be provided and functionality described in connection any particular component can be distributed across multiple instances of such a component. In certain example embodiments, functionality described herein in connection with any given component of the architecture 600 can be distributed among multiple components of the architecture 600. For example, at least a portion of functionality described as being provided by a computing device 602 may be distributed among multiple such computing devices 602.

The network(s) 606 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 606 can have any suitable communication range associated therewith and can include, for example, global networks (e.g., the Internet), metropolitan area networks (MANs), wide area networks (WANs), local area networks (LANs), or personal area networks (PANs). In addition, the network(s) 606 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 602 can include one or more processors (processor(s)) 608, one or more memory devices 610 (generically referred to herein as memory 610), one or more input/output ("I/O") interface(s) 612, one or more network interfaces 614, and data storage 618. The computing device 602 can further include one or more buses 616 that functionally couple various components of the computing device 602. The data storage may store one or more engines, program modules, components, or the like including, without limitation, a vehicle occupant location determination engine 624, an image data analysis engine 626, an other sensor data analysis engine 628, and a vehicle response determination engine 630. Each of the engines/components depicted in FIG. 6 may include logic for performing any of the processes or tasks described earlier in connection with correspondingly named engines/components. In certain example embodiments, any of the depicted engines/components may be implemented in hard-wired circuitry within digital electronic devices such as one or more ASICs or FPGAs that are persistently programmed to perform corresponding techniques.

The bus(es) 616 can include at least one of a system bus, a memory bus, an address bus, or a message bus, and can permit the exchange of information (e.g., data (including computer-executable code), signaling, etc.) between various components of the computing device 602. The bus(es) 616 can include, without limitation, a memory bus or a memory controller, a peripheral bus, an accelerated graphics port, and so forth. The bus(es) 616 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 610 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 610 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 618 can include removable storage and/or non-removable storage including, but not limited to, magnetic storage, optical disk storage, and/or tape storage. The data storage 618 can provide non-volatile storage of computer-executable instructions and other data. The memory 610 and the data storage 618, removable and/or non-removable, are examples of computer-readable storage media (CRSM) as that term is used herein. The data storage 618 can store computer-executable code, instructions, or the like that can be loadable into the memory 610 and executable by the processor(s) 608 to cause the processor(s) 608 to perform or initiate various operations. The data storage 618 can additionally store data that can be copied to memory 610 for use by the processor(s) 608 during the execution of the computer-executable instructions. Moreover, output data generated as a result of execution of the computer-executable instructions by the processor(s) 608 can be stored initially in memory 610 and can ultimately be copied to data storage 618 for non-volatile storage.

More specifically, the data storage 618 can store one or more operating systems (O/S) 620 and one or more database management systems (DBMS) 622 configured to access the memory 610 and/or one or more external datastore(s) (not depicted) potentially via one or more of the networks 606. In addition, the data storage 618 may further store one or more program modules, applications, engines, computer-executable code, scripts, or the like. For instance, any of the engines/components depicted in FIG. 6 may be implemented as software and/or firmware that includes computer-executable instructions (e.g., computer-executable program code) loadable into the memory 610 for execution by one or more of the processor(s) 608 to perform any of the techniques described herein.

Although not depicted in FIG. 6, the data storage 618 can further store various types of data utilized by engines/components of the computing device 602. Such data may include, without limitation, image data, other sensor data, object type labeled data (e.g., training data for object detection algorithms), etc. Any data stored in the data storage 618 can be loaded into the memory 610 for use by the processor(s) 608 in executing computer-executable program code. In addition, any data stored in the data storage 618 can potentially be stored in one or more external datastores that are accessible via the DBMS 622 and loadable into the memory 610 for use by the processor(s) 608 in executing computer-executable instructions/program code.

The processor(s) 608 can be configured to access the memory 610 and execute computer-executable instructions/program code loaded therein. For example, the processor(s) 608 can be configured to execute computer-executable instructions/program code of the various engines/components of the computing device 602 to cause or facilitate various operations to be performed in accordance with one or more embodiments of the invention. The processor(s) 608 can include any suitable processing unit capable of accepting data as input, processing the input data in accordance with stored computer-executable instructions, and generating output data. The processor(s) 608 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 608 can be made capable of supporting any of a variety of instruction sets.

Referring now to other illustrative components depicted as being stored in the data storage 618, the O/S 620 can be loaded from the data storage 618 into the memory 610 and can provide an interface between other application software executing on the computing device 602 and hardware resources of the computing device 602. More specifically, the O/S 620 can include a set of computer-executable instructions for managing hardware resources of the computing device 602 and for providing common services to other application programs. In certain example embodiments, the O/S 620 can include or otherwise control execution of one or more of the engines/program modules stored in the data storage 618. The O/S 620 can include any operating system now known or which can be developed in the future including, but not limited to, any server operating system, any mainframe operating system, or any other proprietary or non-proprietary operating system.

The DBMS 622 can be loaded into the memory 610 and can support functionality for accessing, retrieving, storing, and/or manipulating data stored in the memory 610, data stored in the data storage 618, and/or data stored in external datastore(s) (not shown in FIG. 6). The DBMS 622 can use any of a variety of database models (e.g., relational model, object model, etc.) and can support any of a variety of query languages. The DBMS 622 can access data represented in one or more data schemas and stored in any suitable data repository. Datastore(s) that may be accessible by the computing device 602 via the DBMS 622, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 602, the input/output (I/O) interface(s) 612 can facilitate the receipt of input information by the computing device 602 from one or more I/O devices as well as the output of information from the computing device 602 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 602 or can be separate therefrom. The I/O devices can further include, for example, any number of peripheral devices such as data storage devices, printing devices, and so forth.

The I/O interface(s) 612 can also include an interface for an external peripheral device connection such as universal serial bus (USB), FireWire, Thunderbolt, Ethernet port or other connection protocol that can connect to one or more networks. The I/O interface(s) 612 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 602 can further include one or more network interfaces 614 via which the computing device 602 can communicate with any of a variety of other systems, platforms, networks, devices, and so forth. The network interface(s) 614 can enable communication, for example, with the sensors 604 and/or one or more other devices via one or more of the network(s) 606. In example embodiments, the network interface(s) 614 provide a two-way data communication coupling to one or more network links that are connected to one or more of the network(s) 606. For example, the network interface(s) 614 may include an integrated services digital network (ISDN) card, a cable modem, a satellite modem, or a modem to provide a data communication connection to a corresponding type of telephone line. As another non-limiting example, the network interface(s) 614 may include a local area network (LAN) card to provide a data communication connection to a compatible LAN (or a wide area network (WAN) component to communicate with a WAN). Wireless links may also be implemented. In any such implementation, the network interface(s) 614 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 606 and the signals on network links and through the network interface(s) 614, which carry the digital data to and from the computing device 602, are example forms of transmission media. In example embodiments, the computing device 602 can send messages and receive data, including program code, through the network(s) 606, network links, and network interface(s) 614. For instance, in the Internet example, a server might transmit a requested code for an application program through the Internet, the ISP, a local network, and a network interface 614. The received code may be executed by a processor 608 as it is received, and/or stored in the data storage 618, or other non-volatile storage for later execution.

It should be appreciated that the engines depicted in FIG. 6 as part of the computing device 602 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 602 and/or hosted on other computing device(s) (e.g., 602) accessible via one or more of the network(s) 606, can be provided to support functionality provided by the engines depicted in FIG. 6 and/or additional or alternate functionality. In addition, engines that support functionality described herein can be implemented, at least partially, in hardware and/or firmware and can be executable across any number of computing devices 602 in accordance with any suitable computing model such as, for example, a client-server model, a peer-to-peer model, and so forth.

It should further be appreciated that the computing device 602 can include alternate and/or additional hardware, software, and/or firmware components beyond those described or depicted without departing from the scope of the invention. More particularly, it should be appreciated that software, firmware, and/or hardware components depicted as forming part of the computing device 602 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electro-magnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 616. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being redefined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for detecting presence of an object within a vehicle, the method comprising:
   capturing first image data of a region of the vehicle prior to an occupant of the vehicle being within a first predetermined distance of the vehicle;
   determining that the occupant has exited the vehicle;
   determining that the occupant is at least a second predetermined distance away from the vehicle;
   capturing second image data of the region of the vehicle after the occupant is determined to be at least the second predetermined distance away from the vehicle;
   performing a comparison analysis of the first image data and the second image data;
   determining, based at least in part on the comparison analysis, that the object is present in the second image data and absent from the first image data;
   capturing gas toxicity data and gas concentration data using a gas sensor;
   capturing infrared (IR) heat signature data by an IR sensor;
   determining whether a gas concentration is above a threshold level for at least a threshold duration; and
   initiating one or more automated vehicle response measures based at least in part on:
     determining that the object is present in the second image data and absent from the first image data,
     the gas concentration being above the threshold level for at least the threshold duration,
     the gas toxicity data, and
     the IR heat signature data.

2. The computer-implemented method of claim 1, wherein capturing the first image data comprises:
   capturing a continuous stream of video data of the region of the vehicle;
   determining a timestamp corresponding to a point in time prior to the occupant of the vehicle being within the first predetermined distance of the vehicle; and
   retrieving a portion of the continuous stream of video data corresponding to the timestamp.

3. The computer-implemented method of claim 1, wherein capturing the second image data comprises:
   capturing a continuous stream of video data of the region of the vehicle;
   determining a timestamp corresponding to a point in time that the occupant is at least the second predetermined distance away from the vehicle; and
   retrieving a portion of the continuous stream of video data corresponding to the timestamp.

4. The computer-implemented method of claim 1, wherein the region of the vehicle is a cargo area of the vehicle, and wherein capturing the first image data and capturing the second image data comprises utilizing one or more cameras located in the cargo area to capture the first image data and the second image data, the one or more cameras cumulatively providing a substantially complete field-of-view of the cargo area.

5. The computer-implemented method of claim 4, further comprising illuminating a light source in the cargo area while capturing at least one of the first image data or the second image data.

6. The computer-implemented method of claim 5, wherein determining, based at least in part on the comparison analysis, that the object is present in the second image data and absent from the first image data comprises:
   determining that a first one or more objects detected in the first image data excludes the object; and
   determining that a second one or more objects detected in the second image data includes the object.

7. The computer-implemented method of claim 1, wherein performing the comparison analysis of the first image data and the second image data comprises performing an object detection analysis on each of the first image data and the second image data to detect any one or more objects present in at least one of the first image data or the second image data.

8. The computer-implemented method of claim 1, further comprising:
   determining an object type of the object;
   determining a likelihood that the object has value to the occupant; and
   determining that the likelihood that the object has value to the occupant exceeds a threshold value,
   wherein initiating the one or more automated vehicle response measures comprises at least one of: i) outputting an audio message from a speaker associated with the vehicle informing the occupant of the presence of the object in the vehicle or ii) sending a notification to a mobile device of the occupant informing the occupant of the presence of the object in the vehicle.

9. The computer-implemented method of claim 1, further comprising:
   determining an object type of the object;
   determining, based at least in part on the object type, that the object is discarded material; and
   determining that an amount of the discarded material exceeds a threshold amount,
   wherein initiating the one or more automated vehicle response measures comprises assessing a punitive measure against a user profile associated with the occupant.

10. The computer-implemented method of claim 1, further comprising:
    capturing sensor data indicative of one or more environmental characteristics of the region of the vehicle;
    detecting, based at least in part on the sensor data, a potential risk to the occupant caused by presence of the object in the region of the vehicle; and
    initiating one or more automated safety measures including at least one of: i) halting the vehicle and instructing the occupant to exit the vehicle or ii) contacting an emergency service provider.

11. The computer-implemented method of claim 1, wherein the second predetermined distance is greater than the first predetermined distance.

12. A system for detecting presence of an object within a vehicle, the system comprising:
    at least one processor; and
    at least one memory storing computer-executable instructions, wherein the at least one processor is configured to access the at least one memory and execute the computer-executable instructions to:
       capture first image data of a region of the vehicle prior to an occupant of the vehicle being within a first predetermined distance of the vehicle;
       determine that the occupant has exited the vehicle;
       determine that the occupant is at least a second predetermined distance away from the vehicle;
       capture second image data of the region of the vehicle after the occupant is determined to be at least the second predetermined distance away from the vehicle;
       perform a comparison analysis of the first image data and the second image data;
       determine, based at least in part on the comparison analysis, that the object is present in the second image data and absent from the first image data;
       capture gas toxicity data and gas concentration data using a gas sensor;
       capture infrared (IR) heat signature data by an IR sensor;
       determine whether a gas concentration is above a threshold level for at least a threshold duration; and
       initiate one or more automated vehicle response measures based at least in part on:
          determining that the object is present in the second image data and absent from the first image data,
          the gas concentration being above the threshold level for at least the threshold duration,
          the gas toxicity data, and
          the IR heat signature data.

13. The system of claim 12, wherein the at least one processor is configured to capture the first image data by executing the computer-executable instructions to:
    capture a continuous stream of video data of the region of the vehicle;
    determine a timestamp corresponding to a point in time prior to the occupant of the vehicle being within the first predetermined distance of the vehicle; and
    retrieve a portion of the continuous stream of video data corresponding to the timestamp.

14. The system of claim 12, wherein the at least one processor is configured to capture the second image data by executing the computer-executable instructions to:

capture a continuous stream of video data of the region of the vehicle;

determine a timestamp corresponding to a point in time that the occupant is at least the second predetermined distance away from the vehicle; and retrieve a portion of the continuous stream of video data corresponding to the timestamp.

15. The system of claim 12, wherein the region of the vehicle is a cargo area of the vehicle, and wherein the at least one processor is configured to capture the first image data and capture the second image data by executing the computer-executable instructions to utilize one or more cameras located in the cargo area to capture the first image data and the second image data, the one or more cameras cumulatively providing a substantially complete field-of-view of the cargo area.

16. The system of claim 12, wherein the at least one processor is configured to perform the comparison analysis of the first image data and the second image data by executing the computer-executable instructions to perform an object detection analysis on each of the first image data and the second image data to detect any one or more objects present in at least one of the first image data or the second image data.

17. The system of claim 12, wherein the at least one processor is configured to determine, based at least in part on the comparison analysis, that the object is present in the second image data and absent from the first image data by executing the computer-executable instructions to:

determine that a first one or more objects detected in the first image data excludes the object; and determine that a second one or more objects detected in the second image data based at least in part on the object detection analysis includes the object.

18. The system of claim 12, wherein the at least one processor is further configured to execute the computer-executable instructions to:

determine an object type of the object;

determine a likelihood that the object has value to the occupant; and determine that the likelihood that the object has value to the occupant exceeds a threshold value, wherein the at least one processor is configured to initiate the one or more automated vehicle response measures by executing the computer-executable instructions to at least one of: i) output an audio message from a speaker associated with the vehicle informing the occupant of the presence of the object in the vehicle or ii) send a notification to a mobile device of the occupant informing the occupant of the presence of the object in the vehicle.

19. The system of claim 12, wherein the at least one processor is further configured to execute the computer-executable instructions to:

determine an object type of the object;

determine, based at least in part on the object type, that the object is discarded material; and determine that an amount of the discarded material exceeds a threshold amount, wherein the at least one processor is configured to initiate the one or more automated vehicle response measures by executing the computer-executable instructions to assess a punitive measure against a user profile associated with the occupant.

20. The system of claim 12, wherein the at least one processor is further configured to execute the computer-executable instructions to:

capture sensor data indicative of one or more environmental characteristics of the region of the vehicle;

detect, based at least in part on the sensor data, a potential risk to the occupant caused by presence of the object in the region of the vehicle; and initiate one or more automated safety measures including at least one of:

i) halting the vehicle and instructing the occupant to exit the vehicle or ii) contacting an emergency service provider.

\* \* \* \* \*